(12) United States Patent
Kawaguchi et al.

(10) Patent No.: US 11,410,798 B2
(45) Date of Patent: Aug. 9, 2022

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Tomoya Kawaguchi, Yokkaichi (JP); Masaharu Suetani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 121 days.

(21) Appl. No.: 16/981,091

(22) PCT Filed: Mar. 18, 2019

(86) PCT No.: PCT/JP2019/011223
§ 371 (c)(1),
(2) Date: Sep. 15, 2020

(87) PCT Pub. No.: WO2019/188514
PCT Pub. Date: Oct. 3, 2019

(65) Prior Publication Data
US 2020/0411216 A1 Dec. 31, 2020

(30) Foreign Application Priority Data

Mar. 30, 2018 (JP) .............................. JP2018-069924

(51) Int. Cl.
*H01R 13/52* (2006.01)
*H01B 13/012* (2006.01)
(Continued)

(52) U.S. Cl.
CPC ......... *H01B 13/01209* (2013.01); *H01R 4/72* (2013.01); *H02G 15/02* (2013.01)

(58) Field of Classification Search
CPC ...................................................... H01R 13/52
See application file for complete search history.

(56) References Cited

U.S. PATENT DOCUMENTS

| 5,580,264 A | 12/1996 | Aoyama et al. |
| 2006/0172576 A1* | 8/2006 | Vermoesen .......... H01R 24/542 439/271 |

FOREIGN PATENT DOCUMENTS

| JP | 2007-287464 A | 11/2007 |
| JP | 2008-204960 A | 9/2008 |

(Continued)

OTHER PUBLICATIONS

Jun. 4, 2019 International Search Report issued in International Patent Application No. PCT/JP2019/011223.

*Primary Examiner* — Chau N Nguyen
(74) *Attorney, Agent, or Firm* — Oliff PLC

(57) ABSTRACT

A wire harness including an electric wire that has a core wire and a coating that coats the core wire, a connector that is attached to an end of the electric wire, and a seal that is interposed between the coating of the electric wire and the connector, wherein a tube with a modulus of elasticity higher than that of the coating is provided between the coating and the seal.

3 Claims, 2 Drawing Sheets

(51) Int. Cl.
*H01R 4/72* (2006.01)
*H02G 15/02* (2006.01)

(56) References Cited

FOREIGN PATENT DOCUMENTS

JP  2016-212976 A  12/2016
JP  2017-079562 A   4/2017

* cited by examiner

WIRE HARNESS

BACKGROUND

The present disclosure relates to a wire harness.

Conventionally, as wire harnesses mounted in automobiles and the like, those having electric wires and connectors provided at terminals of the electric wires (see JP 2008-204960A, for example) are known. This sort of connector has a terminal fitting provided at a terminal of a core wire of an electric wire, and a connector housing that holds the terminal fitting. In order to prevent liquid such as water from entering the inside from a gap between the connector and the electric wire, a sealing member is provided between the connector housing and a coating member of the electric wire.

SUMMARY

Incidentally, a sealing member of this sort of wire harness is formed in the shape of a ring, and a predetermined surface pressure is generated between the coating member of the electric wire provided on the inner side of the sealing member and the sealing member, and thus sealing (stopping of water) between the sealing member and the coating member of the electric wire is realized. At this time, the coating member is deformed by the surface pressure from the sealing member. However, deterioration of the sealing member may progress due to heat generated in the connector and the surface pressure between the sealing member and the coating member of the electric wire may decrease, which may make it impossible to maintain the seal performance.

An exemplary aspect of the disclosure provides a wire harness in which it is possible to maintain the seal performance.

A wire harness according to an exemplary aspect includes an electric wire that has a core wire and a coating that coats the core wire, a connector that is attached to an end of the electric wire, and a seal that is interposed between the coating of the electric wire and the connector, wherein a tube with a modulus of elasticity higher than that of the coating is provided between the coating and the seal.

According to this aspect, a tube with a modulus of elasticity higher than that of the coating is provided between the coating and the seal. Thus, the amount of deformation by the seal is suppressed compared with the case in which the seal is directly attached to the coating (electric wire) and the same pressure is applied thereto. Thus, for example, even in the case in which deterioration of the seal progresses due to heat generated in the connector, and the surface pressure between the seal and the tube decreases, the amount of deformation of the tube by the seal is smaller than the amount in the case in which the seal is directly attached to the coating, and thus generation of gaps between the seal and the tube is suppressed. Accordingly, the seal performance can be maintained.

In the above-described wire harness, it is preferable that the tube is formed by a heat shrinkable tube.

According to this aspect, the tube is formed by a heat shrinkable tube. Thus, the tube before shrinkage can be easily inserted over the outside of the electric wire, and can be easily attached to the electric wire.

In the above-described wire harness, it is preferable that the tube is made of the same material as the coating and has a degree of cross-linkage higher than that of the coating.

According to this aspect, the tube is made of the same material as the coating and has a degree of cross-linkage higher than that of the coating. Thus, the tube can have a modulus of elasticity higher than that of the coating, in spite of being made of the same material.

With the wire harness according to aspects of the present disclosure, it is possible to maintain the seal performance.

DETAILED DESCRIPTION OF EMBODIMENTS

Hereinafter, an embodiment will be described with reference to the attached drawings. In the attached drawings, for the sake of ease of description, part of constituent elements may be exaggerated or simplified. Furthermore, in the attached drawings, proportions of constituent elements may be different from those in the actual state.

Figure 1:
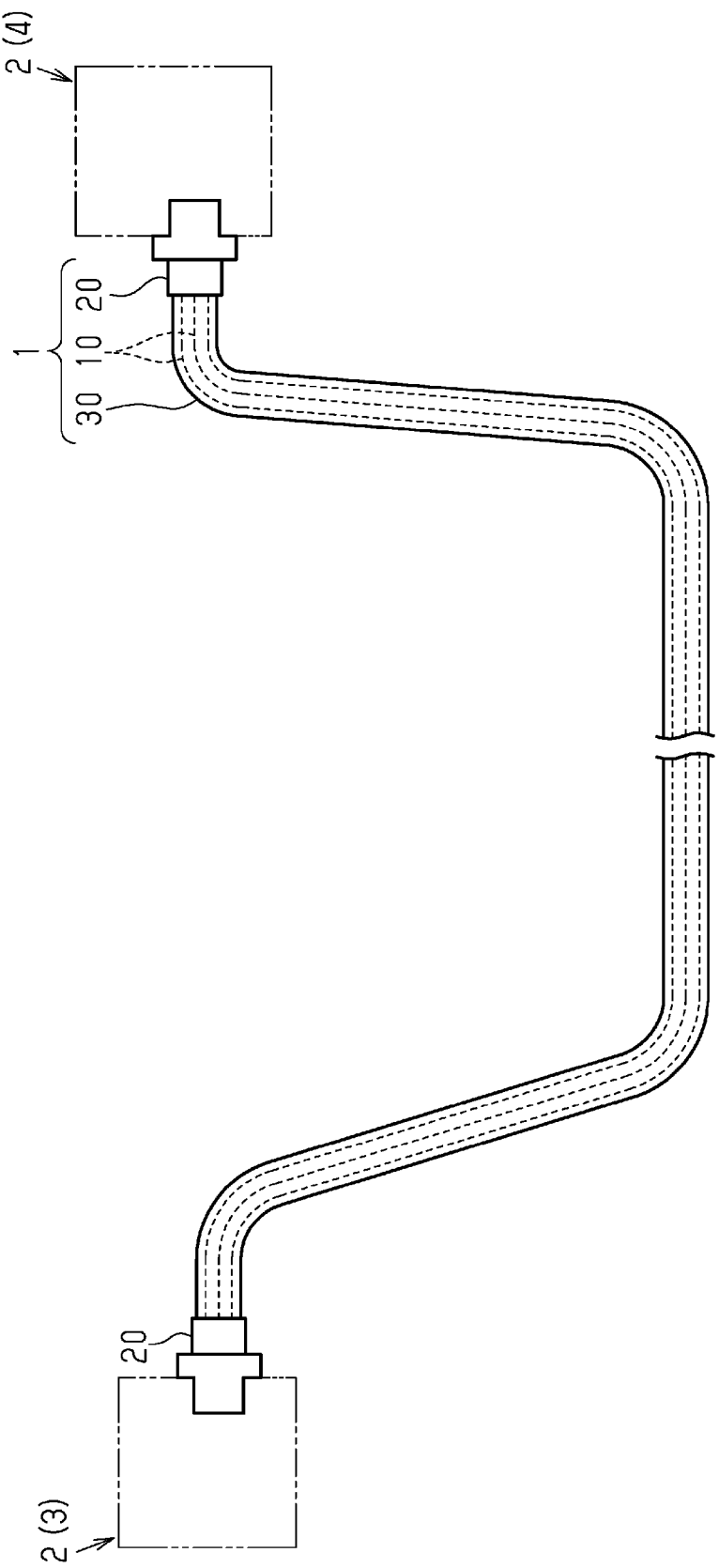
FIG. 1 is a schematic configuration diagram showing a wire harness according to an embodiment.

A wire harness 1 shown in FIG. 1 electrically connects two, three or more electrical devices (devices) 2. The wire harness 1 of this embodiment electrically connects an inverter 3 installed in the front portion of a vehicle such as a hybrid car or an electric vehicle, and a high-voltage battery 4 installed on the rear side of the inverter 3 in the vehicle. The wire harness 1 is arranged, for example, so as to extend under a floor of the vehicle. The inverter 3 is connected to a motor for driving wheels (not shown) that serves as the power source for a vehicle to travel. The inverter 3 generates AC power from DC power from the high-voltage battery 4 and supplies the AC power to the motor. The high-voltage battery 4 is, for example, a battery capable of supplying a voltage of several hundred volts.

The wire harness 1 has a plurality of (two, in this embodiment) electric wires 10, a pair of connectors 20 that are attached to the respective ends of the electric wires 10, and a protective tube 30 that collectively encloses the plurality of electric wires 10. One of the connectors 20 is connected to the inverter 3, and the other connector 20 is connected to the high-voltage battery 4. The protective tube 30 may be constituted by, for example, a pipe made of metal or resin, a flexible corrugated tube made of resin or the like, a waterproof cover made of rubber or the like, or a combination thereof. The protective tube 30 protects, for example, the electric wires 10 contained therein from flying objects or liquid.

Each electric wire 10 has a core wire 11, and a coating member 12 (coating) that coats the outer circumference of the core wire 11. The core wire 11 may be constituted by, for example, a twisted wire obtained by twisting a plurality of metal element wires. The core wire 11 is made of, for example, a metal with excellent conductivity such as copper, a copper alloy, aluminum, or an aluminum alloy. The coating member 12 coats, for example, the entire outer circumferential face of the core wire 11 in intimate contact therewith. The coating member 12 is made of, for example, an insulating material such as cross-linked polyethylene. The coating member 12 can be formed, for example, through extrusion molding (extrusion coating) on the core wire 11.

Figure 2:
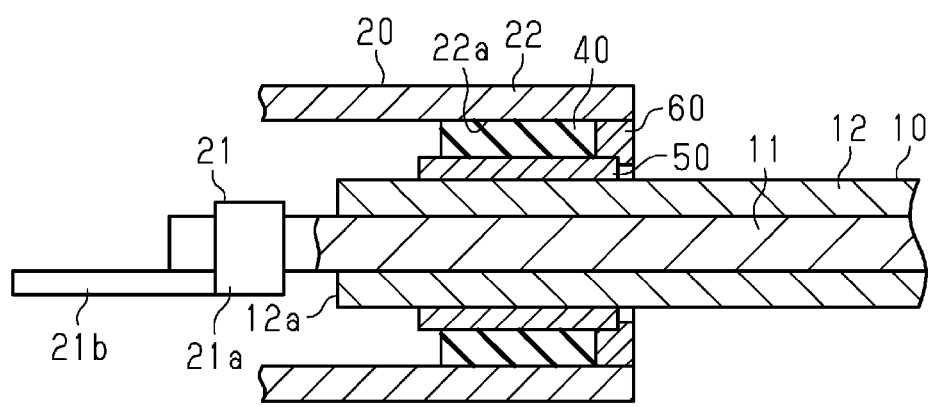
FIG. 2 is a cross-sectional view around a connector of the wire harness according to the embodiment.

As shown in FIG. 2, each connector 20 has a terminal fitting 21 and a connector housing 22.

The terminal fitting 21 is connected to ends of the electric wires 10. The terminal fitting 21 has a barrel portion 21a and a terminal portion 21b. The barrel portion 21a is electrically connected to the core wires 11 of the electric wires 10 through crimping to the core wires 11 of the electric wires 10.

The connector housing 22 is formed, for example, substantially in the shape of a tube. The connector housing 22 is made of resin.

Furthermore, the wire harness 1 of this embodiment has a sealing member 40 (seal) and a tubular member 50 (tube) between an inner circumferential face 22*a* of the connector housing 22 and the coating members 12.

The sealing member 40 may be constituted by, for example, a rubber plug. The sealing member 40 is held in intimate contact with the connector housing 22 and the tubular member 50 throughout the circumferential direction, between the inner circumferential face 22*a* of the connector housing 22 and the tubular member 50. A retainer 60 is attached to the connector housing 22, on the opposite side of the terminal fitting 21 with respect to the sealing member 40.

The tubular member 50 is substantially in the shape of a cylinder, and is held in intimate contact with the sealing member 40 and the coating members 12 throughout the circumferential direction, between the sealing member 40 and the coating members 12. The tubular member 50 of this example is provided at a position away from ends 12*a* of the coating members 12. That is to say, the tubular member 50 does not cover the ends 12*a*.

The tubular member 50 is constituted by, for example, a heat shrinkable tube. The tubular member 50 is constituted by, for example, a member with a modulus of elasticity higher than that of the coating member 12, that is, a member that is unlikely to be deformed. Furthermore, the tubular member 50 may be made of the same cross-linked polyethylene as the coating member 12. If the tubular member 50 and the coating member 12 are both made of cross-linked polyethylene, for example, the modulus of elasticity of the tubular member 50 can be increased and the tubular member 50 can be made less likely to be deformed than the coating member 12, by setting the degree of cross-linkage (cross-link density) of cross-linked polyethylene that is used for the tubular member 50 higher than that for the coating member 12. For example, the cross-linked polyethylene that is used for the coating member 12 is an example of a first cross-linked polymer in which molecular chains made of or containing a first monomer (ethylene) are cross-linked at a first degree of cross-linkage, and the cross-linked polyethylene that is used for the tubular member 50 is an example of a second cross-linked polymer in which molecular chains made of or containing the first monomer (ethylene) are cross-linked at a second degree of cross-linkage that is higher than the first degree of cross-linkage. It is also possible that the tubular member 50 and the coating member 12 are made of the same material (constituent material) that is not limited to cross-linked polyethylene, and the degree of cross-linkage of the tubular member 50 is increased as described above. If the tubular member 50 and the coating member 12 are made of the same material, they are likely to bind to each other in a molecular level, and can firmly bind to each other, and thus the intimate contact state can be easily maintained.

Hereinafter, actions of this embodiment will be described.

According to the wire harness 1 of this embodiment, the tubular member 50 with a modulus of elasticity higher than that of the coating member 12 is provided between the sealing member 40 and the coating member 12 arranged inside the connector housing 22. Accordingly, even when the pressure is applied from the sealing member 40 toward the tubular member 50 (to the inner side in the radial direction), the amount of deformation of the tubular member 50 is suppressed compared with the coating member 12.

Hereinafter, effects of this embodiment will be described.

(1) Since a tubular member 50 provided between a sealing member 40 and a coating member 12 has a modulus of elasticity higher than that of the coating member 12, the amount of deformation by the sealing member 40 is suppressed compared with the case in which the sealing member 40 is directly attached to the coating member 12 and the same pressure is applied thereto. Thus, for example, even in the case in which deterioration of the sealing member 40 progresses due to heat generated in the connector 20, and the surface pressure between the sealing member 40 and the tubular member 50 decreases, the amount of deformation of the tubular member 50 by the sealing member 40 is smaller than the amount in the case in which the sealing member 40 is directly attached to the coating member 12, and thus generation of gaps between the sealing member 40 and the tubular member 50 is suppressed. Accordingly, the seal performance can be maintained.

(2) Since only the tubular member 50 has a modulus of elasticity higher than that of each coating member 12, the coating member 12 that coats substantially the entire core wire 11 has a relatively low modulus of elasticity, and thus the flexibility of the electric wires 10 can be maintained. In particular, electric wires 10 that are used in electric vehicles and the like have a large diameter and/or cross-sectional area of the core wire 11, and thus the electric wires 10 are unlikely to be bent. Accordingly, it is useful to suppress deterioration in the bendability (flexibility) of the electric wires 10, by using such coating members 12 with a relatively low modulus of elasticity.

(3) Since the tubular member 50 is constituted by a heat shrinkable tube, the tubular member 50 before shrinkage can be easily inserted over the outside of the electric wire 10, and can be easily attached to the electric wire 10.

(4) Since the tubular member 50 is made of the same material as the coating member 12 and has a degree of cross-linkage higher than that of the coating member 12, the tubular member 50 can have a modulus of elasticity higher than that of the coating member 12 (can be made unlikely to be deformed), in spite of being made of the same material.

Note that the foregoing embodiment may be modified as follows.

In the foregoing embodiment, the tubular member 50 is directly arranged on the coating member 12 of the electric wire 10 in intimate contact therewith, but the configuration is not limited to this. For example, it is also possible to employ a configuration in which the tubular member 50 and the coating member 12 are bonded to each other by arranging an adhesive between the tubular member 50 and the coating member 12.

In the foregoing embodiment, the tubular member 50 is constituted by a heat shrinkable tube, but the configuration is not limited to this. It is also possible that the member by which the tubular member 50 is constituted is changed as appropriate, as long as it is a member with a modulus of elasticity higher than that of the coating member 12 of the electric wire 10 (a member that is unlikely to be deformed).

In the foregoing embodiment, the tubular member 50 and the coating member 12 are made of the same material (e.g., polymers made of the same monomer or containing the same monomer unit, and having different moduli of elasticity or degrees of cross-linkage), but it is also possible that the tubular member 50 and the coating member 12 are made of different materials, as long as the tubular member 50 is made of a material with a modulus of elasticity higher than that of the coating member 12 of the electric wire 10. For example, it is also possible that the coating member 12 is made of a first polymer having a first monomer unit and a first modulus of elasticity, and the tubular member 50 is made of a second polymer having a second monomer unit that is different from the first monomer unit and a second modulus of elasticity that is higher than the first modulus of elasticity.

In the foregoing embodiment, the tubular member 50 is provided at a position away from the end 12*a* in the longitudinal direction of each coating member 12, and does not cover the end 12*a*, but the configuration is not limited to this. It is also possible to employ a configuration in which the end 12*a* of the coating member 12 is covered by part of the tubular member 50.

The outer circumferential face of the coating member 12 may be referred to as a radially outer face of the coating member 12. The outer circumferential face and the inner circumferential face of the sealing member 40 may be referred to as a radially outer sealing face and a radially inner sealing face of the sealing member 40. The outer circumferential face and the inner circumferential face of the tubular member 50 may be referred to as a radially outer face and a radially inner face of the tubular member 50.

The coating member 12 of the electric wire 10 may have the same, that is, a constant first diameter along the entire length in the longitudinal direction of the coating member 12, but it is also possible that the coating member 12 has the same, that is, a constant first diameter at least in a predetermined lengthwise portion arranged inside the connector housing 22. In the example shown in the drawings, the coating member 12 is constituted by a single coating layer.

The tubular member 50 is in intimate contact with the outer circumferential face of the coating member 12, preferably in a liquid-tight manner, at a local position on the coating member 12 in the longitudinal direction, and has a large-diameter portion with a second diameter that is larger than the first diameter of the coating member 12, at the local position on the coating member 12. In the example shown in the drawings, the tubular member 50 is constituted by a single tube.

The sealing member 40 is sandwiched in the radial direction between the inner circumferential face 22*a* of the connector housing 22 and the outer circumferential face of the tubular member 50, and is held in a compressed state in the radial direction between the inner circumferential face 22*a* of the connector housing 22 and the outer circumferential face of the tubular member 50. The outer circumferential face and the inner circumferential face of the sealing member 40 are respectively in intimate contact with the inner circumferential face 22*a* of the connector housing 22 and the outer circumferential face of the tubular member 50, preferably in a liquid-tight manner. In the example shown in the drawings, the sealing member 40 is constituted by a single member or one-piece member.

In non-limiting examples, the length in the axial direction of the tubular member 50 is shorter than the distance in the axial direction from the end face of the coating member 12 to the opening of the connector housing 22, and is longer than the length in the axial direction of the sealing member 40. In the example shown in the drawings, the tubular member 50 does not project outward in the axial direction from the opening of the connector housing 22, and the entire tubular member 50 is accommodated inside the connector housing 22.

In non-limiting examples, the retainer 60 abuts against the ring-like end face of the sealing member 40, thereby preventing the sealing member 40 from being detached from the opening of the connector housing 22. In the example shown in the drawings, the entire ring-like end face of the sealing member 40 and part of the ring-like end face of the tubular member 50 respectively abut against the outer ring-like end face and the inner ring-like end face of the retainer 60. A step in the axial direction is formed between the outer ring-like end face and the inner ring-like end face of the retainer 60. At this step in the axial direction, part of the radially outer face of the tubular member 50 may be in intimate contact with the retainer 60.

The foregoing embodiment and the modified examples may be combined as appropriate.

The present disclosure encompasses the following configurations. The reference numerals of the constituent elements of the embodiment are indicated not for limitation but for facilitating the understanding.

[Note 1]

A wire harness (1) according to some implementation examples includes: an electric wire (10) that has a core wire (11), and an insulating coating member (12) coating the core wire (11) and having a first diameter; a terminal fitting (21) that is fixed to an exposed end of the core wire (11) projecting from an end face of the insulating coating member (12); a connector housing (22) that has an opening through which the electric wire (10) can pass, and an inner circumferential face (22*a*) surrounding, from the outer side, a connecting portion of the core wire (11) and the terminal fitting (21); a tubular sealing member (40) that is attached to the inner circumferential face (22*a*) of the connector housing (22); a tubular member (50) that is in intimate contact with the insulating coating member (12) at a local position in the longitudinal direction, on a radially outer face of the insulating coating member (12) of the electric wire (10); and a retainer (60) that is attached to the opening of the connector housing (22) and is in contact with a ring-like end face of the sealing member (40), thereby preventing the sealing member (40) from being detached from the connector housing (22), wherein the tubular member (50) has a large-diameter portion with a second diameter that is larger than the first diameter of the coating member (12), at the local position on the coating member (12), the sealing member (40) is sandwiched in the radial direction between the inner circumferential face (22*a*) of the connector housing (22) and a radially outer face of the tubular member (50), and is held in a compressed state in the radial direction between the inner circumferential face (22*a*) of the connector housing (22) and the radially outer face of the tubular member (50), and a modulus of elasticity of the tubular member (50) is higher than a modulus of elasticity of the insulating coating member (12).

[Note 2]

In some implementation examples, the insulating coating member (12) is made of a first cross-linked polymer in which first monomers are cross-linked at a first degree of cross-linkage, and the tubular member (50) is made of a second cross-linked polymer in which the first monomers are cross-linked at a second degree of cross-linkage that is higher than the first degree of cross-linkage.

[Note 3]

In some implementation examples, a length in an axial direction of the tubular member (50) is shorter than a distance in the axial direction from the end face of the insulating coating member (12) to the opening of the connector housing (22).

[Note 4]

In some implementation examples, the length in the axial direction of the tubular member (50) is longer than a length in the axial direction of the sealing member (40).

[Note 5]

In some implementation examples, the tubular member (50) does not project outward in the axial direction from the opening of the connector housing (22).

[Note 6]

In some implementation examples, the sealing member (40) and the tubular member (50) have ring-like end faces inside the opening of the connector housing (22), the entire ring-like end face of the sealing member (40) abuts against an outer ring-like end face of the retainer (60), at least part of the ring-like end face of the tubular member (50) abuts against an inner ring-like end face of the retainer (60), a step in the axial direction is formed between the outer ring-like end face and the inner ring-like end face of the retainer (60), and part of the radially outer face of the tubular member (50) is in intimate contact with the retainer (60) at the step in the axial direction.

It will be appreciated by those skilled in the art that the present disclosure may be embodied in other specific modes without departing from the technical idea thereof. For example, some of constituent elements described in the embodiment (or one or a plurality modes thereof) may be omitted or combined.

The invention claimed is:

1. A wire harness comprising
an electric wire that has a core wire and a coating that coats the core wire,
a connector that is attached to an end of the electric wire, and
a seal that is interposed between the coating of the electric wire and the connector, wherein
a tube with a modulus of elasticity higher than that of the coating is provided between the coating and the seal, and
a retainer is provided (i) attached to the connector, (ii) abutting an end face of the tube, and (iii) abutting an entirety of an end face of the seal.

2. The wire harness according to claim 1, wherein the tube is formed by a heat shrinkable tube.

3. The wire harness according to claim 1, wherein the tube is made of a same material as the coating and has a degree of cross-linkage higher than that of the coating.

* * * * *